(No Model.)
2 Sheets—Sheet 1.
E. R. ROBINSON.
ELECTRIC RAILWAY TROLLEY.
No. 505,370.  Patented Sept. 19, 1893.
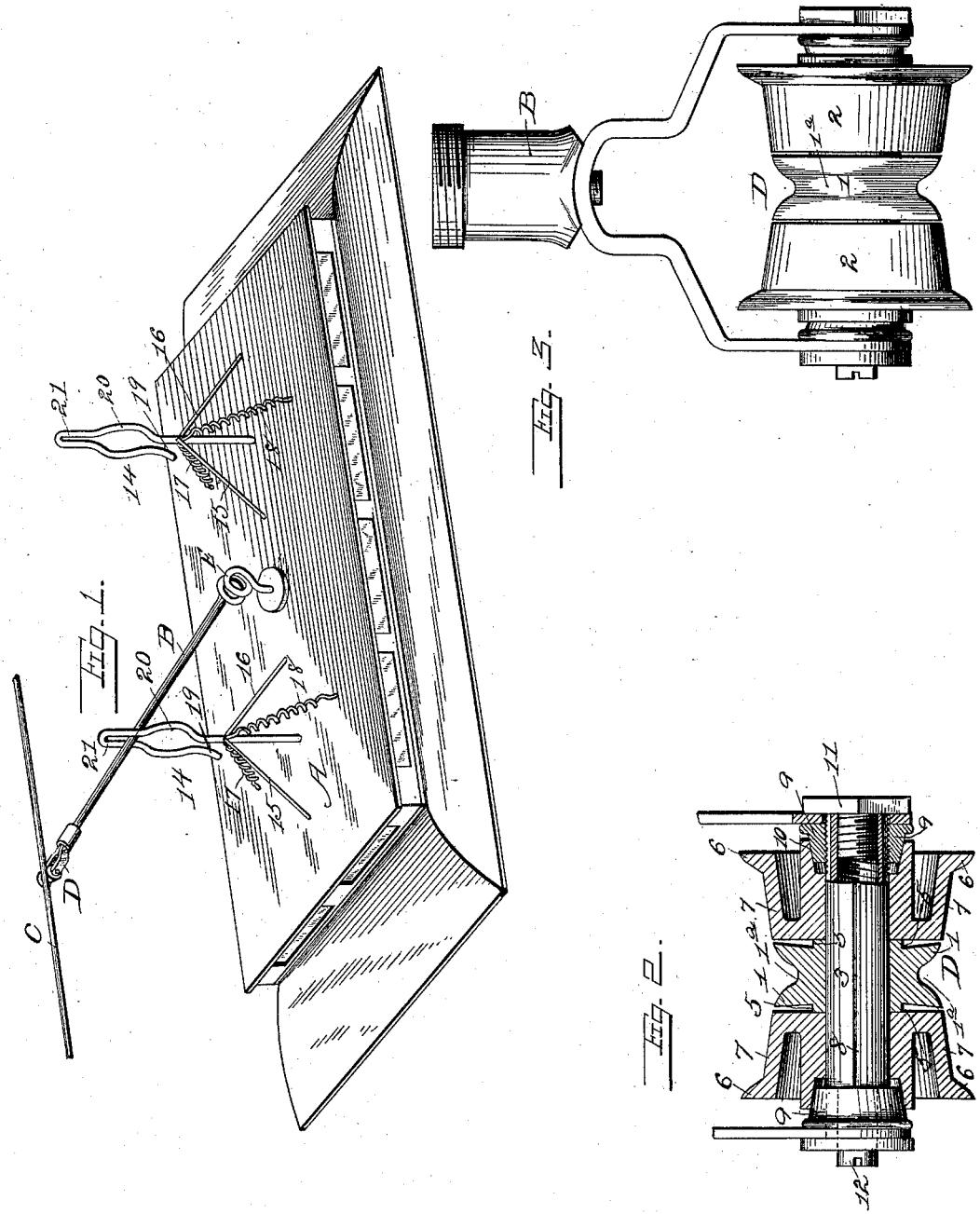
Attest:
Walter ~~~~
Geo. ~~~~
Inventor:
E. R. Robinson
By Knight Bros.
Attorneys.

(No Model.)	2 Sheets—Sheet 2.
E. R. ROBINSON.
ELECTRIC RAILWAY TROLLEY.
No. 505,370.　　　　　Patented Sept. 19, 1893.
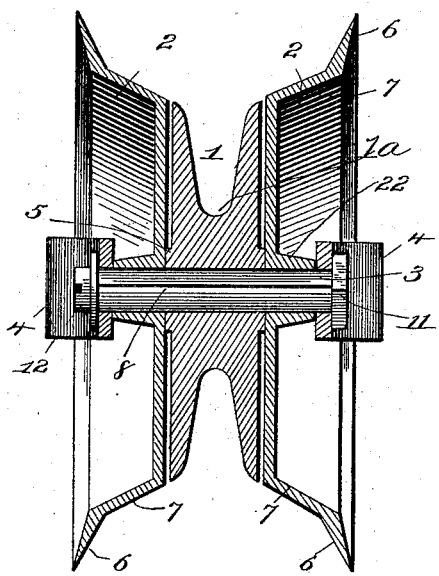
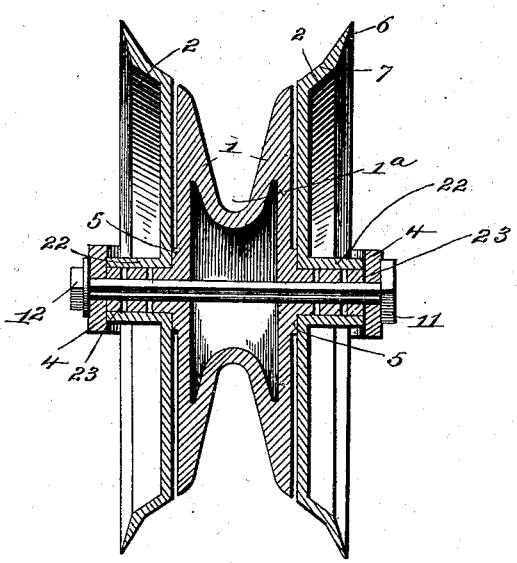
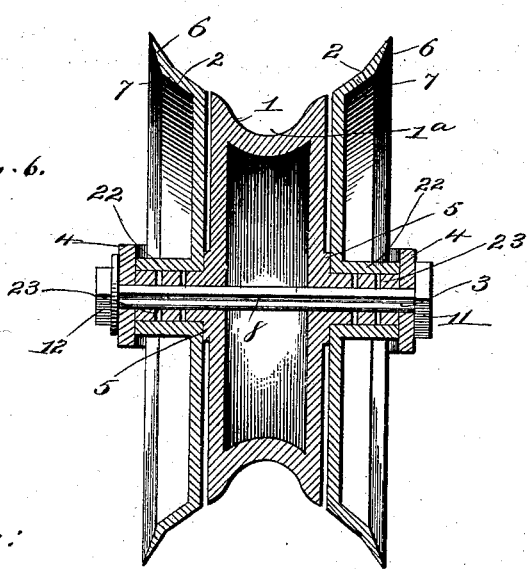
Witnesses:　　　　　Inventor:
　　　　　　　　　　E. R. Robinson
　　　　　　　　By Knight Bros.
　　　　　　　　　　Attorneys.

UNITED STATES PATENT OFFICE.

ELBERT R. ROBINSON, OF NASHVILLE, TENNESSEE.

ELECTRIC-RAILWAY TROLLEY.

SPECIFICATION forming part of Letters Patent No. 505,370, dated September 19, 1893.

Application filed March 7, 1893. Serial No. 464,967. (No model.)

*To all whom it may concern:*

Be it known that I, ELBERT R. ROBINSON, a citizen of the United States, and a resident of Nashville, in the county of Davidson and State of Tennessee, have invented new and useful Improvements in Trolleys for Electric Railways, of which the following is a specification.

My invention relates to improvements in trolleys which are used in overhead electric railway systems in which the trolley is of peculiar construction, the trolley pole and its elevating spring are mounted on a turn-table, and guides are placed at opposite ends of the car to receive the trolley and prevent its jumping from the wire when the car is rounding a curve or going down an incline in the road.

My improved trolley wheel consists of three independent pulleys, being a central grooved pulley and the two outer beveled pulleys, mounted on the same axle, and my improved guide consists of an open metal loop secured to the top of the car by means of braces, and having springs which will yield somewhat to the trolley when the car is rounding a curve.

My invention further consists of certain novel features to be hereinafter fully described and particularly pointed out in the claims.

Referring to the drawings which form a part of this specification: Figure 1 is a perspective view of the top of a car showing the guides mounted at each end thereof and the trolley working therein. Fig. 2 is an axial section of my improved trolley also showing a part of the axle in section, and Fig. 3 is a front elevation of the same. Figs. 4, 5, and 6 are modifications of my improved trolley.

A represents the top of a car, B the trolley arm which is pivotally mounted on a turn-table in the middle thereof and provided with the trolley D which bears and is held against the wire C, by means of the spring E.

The trolley D is composed of three pulleys or wheels 1, 2 which are mounted and adapted to revolve on the axle 3, the whole being mounted in the frame 4 and held therein by means of the nut 11 and screw 12. The middle pulley or wheel 1 is provided with a groove 1ª for the wire C, and a short hub 5, which bears against the wheels 2, 2, so that it can revolve independently of them. In Figs. 5 and 6 the short hub has formed integrally with it a perforated trunnion 23, which forms a bearing for the hubs 22 of the dished outer pulleys.

The wheels or pulleys 2, are provided with outwardly turned flanges 6 and treads 7 which incline toward the groove 4 of the wheel 1. The object in so forming these outside pulleys is to cause the wire when thrown on either of them, to be guided back into the groove of the middle pulley thus saving the wear to which said pulley would be subjected if it were only provided with deep flanges. The axle 3 has grooves 8 formed therein, which are adapted to distribute oil for the lubrication of the pulleys or wheels, the oil being supplied to these grooves from around the ends of the axle where it is confined and prevented from escaping by means of the thimbles 9. These thimbles 9 are beveled as shown at 10 and form a bearing for the outside wheels or pulleys 2, 2.

The guides 14 are placed at each end of the car and are secured to the top of the car by means of the braces 15, 16. Springs 17 and 18 are placed on each side thereof to hold them in place with a yielding force. The guide consists of a single piece of metal bent so as to form a loop with an opening 19 near the lower end to receive the trolley arm B into the guide. A bulge or enlarged portion 20 is formed above the opening 19 and above this bulge is a contracted loop 21, the bulge being adapted to permit lateral play when rounding a curve where the wire is purposely lowered so that the wire C is thrown up on one of the outside pulleys, 2, while the contracted loop 21 is adapted to guide the trolley beneath the wire and prevent bounding off when the car is going over unevenesses in the road.

In Figs. 4, 5, and 6 the outer pulleys are shown as being dished and they are provided with hubs 22 which bear upon the perforated trunnions of the middle pulley. The middle pulley shown in Figs. 5 and 6 is made hollow and has perforated trunnions 23 formed integral therewith. The object in perforating these trunnions is to allow the oil to lubricate the bearing surface on them.

Having thus described my invention, what

I claim as new therein, and desire to secure by Letters Patent, is—

1. A trolley wheel constructed with a centrally grooved tread and broad supplementary flanged treads at the sides of the grooved tread for receiving the wire when the wheel's axis is not at right angles thereto as explained.

2. In a trolley for electric railways, the combination of the frame, the axle mounted in said frame, grooves formed on said axle, and the three independent pulleys mounted on said axle and consisting of the centrally grooved pulley and the outer pulleys provided with the broad inwardly inclined treads, substantially as and for the purpose set forth.

3. In a trolley for electric railways, the combination of the frame, the axle mounted in said frame, and the three independent pulleys mounted on said axle, and consisting of a middle pulley formed with a groove and two outer pulleys formed with out turned flanges and inwardly inclined treads, substantially as set forth.

4. In a trolley for electric railways, the combination of the frame, the axle mounted in said frame, and the three independent pulleys mounted on said axle, consisting of the dished outer pulleys formed with the inclined treads and the hollow grooved middle pulley, substantially as set forth.

5. In a trolley for electric railways, the combination of the frame, the grooved axle mounted in said frame, and the three independent pulleys mounted on said axle, consisting of the hollow grooved middle pulley having perforated trunnions and the outer dished pulleys provided with hubs bearing on the perforated trunnions of the hollow grooved middle pulley, substantially as set forth.

6. In a trolley for electric railways, the combination of the trolley wheel, the arm, the spring for holding the wheel against the electric conductor, and the independent guides placed at each end of the car consisting of a bar of metal formed into an open loop, substantially as set forth.

7. In a trolley for electric railways, the combination of a trolley wheel held against the electric conductor by means of a spring and independent guide consisting of a bar of metal formed into a loop with an opening near its lower end and an enlargement and contracted portion above the loop, substantially as set forth.

8. In an electric railway, the combination of the trolley centrally pivoted on the car, an elevating spring between the trolley and its pivot, a pair of laterally yielding guides on the car, and springs for holding the guides normally yielding, substantially as set forth.

9. In an electric railway, the combination of the centrally pivoted trolley having the central grooved pulley and the lateral guide pulleys, and the guides on the car into which the trolley may enter, and provided with the upper restricted loop for holding the trolley in the vertical plane of the conductor, and the intermediate bulge for permitting lateral play in rounding curves, all substantially as explained.

ELBERT R. ROBINSON.

Witnesses:
CHAS. L. RUCKER,
J. E. LOVE.